July 28, 1964 W. P. SIEGMUND ETAL 3,142,236

CAMERAS AND HIGH SPEED OPTICAL SYSTEM THEREFOR

Filed March 8, 1961 2 Sheets-Sheet 1

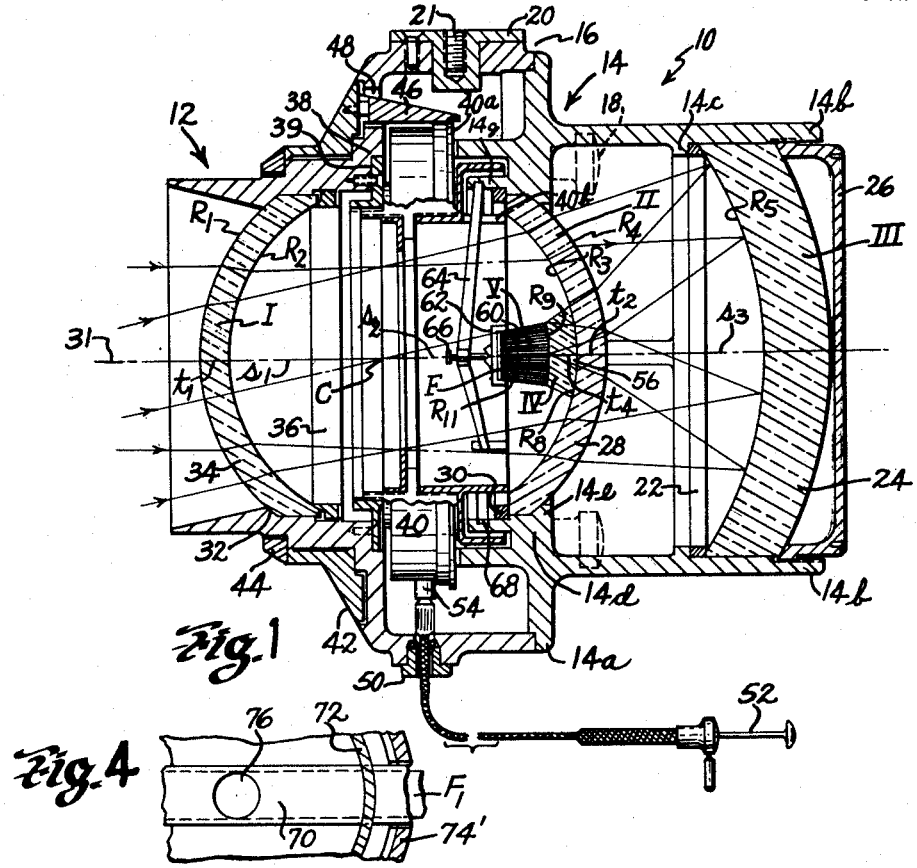

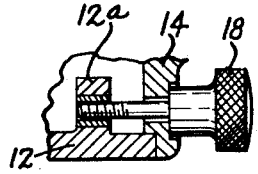

Fig. 3

| TABLE A | | | | | | | |
|---|---|---|---|---|---|---|---|
| E.F.L.= 1.000 | | TOTAL FIELD ANGLE 25° | | | f/0.58 | | |
| LENS | RADII | THICKNESSES | C.A. | $N_D$ | $N_F$ | $N_C$ | V |
| I | $R_1$=1.940 | $t_1$=0.293 | 2.42 | 1.51671 | 1.52236 | 1.51431 | 64.2 |
| | $R_2$=1.647 | | 2.24 | | | | |
| DIAPHRAGM | | $\Delta_1$=1.647 | 1.73 | | | | |
| | | $\Delta_2$=1.647 | | | | | |
| II | $R_3$=-1.647 | $t_2$=0.293 | 2.42 | 1.51671 | 1.52236 | 1.51431 | 64.2 |
| | $R_4$=-1.940 | | 2.76 | | | | |
| | | $\Delta_3$=1.511 | | | | | |
| III | $R_5$=-3.448 | APPROX..65 | 3.63 | 1.0000 | -1.0000 | -1.0000 | |
| IV | $R_8$=-1.647 | $t_4$=-0.231 | .86 | 1.51671 | 1.52236 | 1.51431 | 64.2 |
| | $R_9$=-1.416 | | .62 | | | | |
| V | $R_{10}$=-1.416 | $t_5$=-0.431 | .62 | FIBER BUNDLE TAPER 14ltb1 | | | |
| | $R_{11}$=PLANO | | .43 | | | | |
| I, II, IV = BK-7 GLASS | | | | | V = PYREX | | |

Fig. 2

INVENTORS
WALTER P. SIEGMUND
RALPH H. WIGHT
BY Louis K. Gagnon
Noble J. Williams
ATTORNEYS

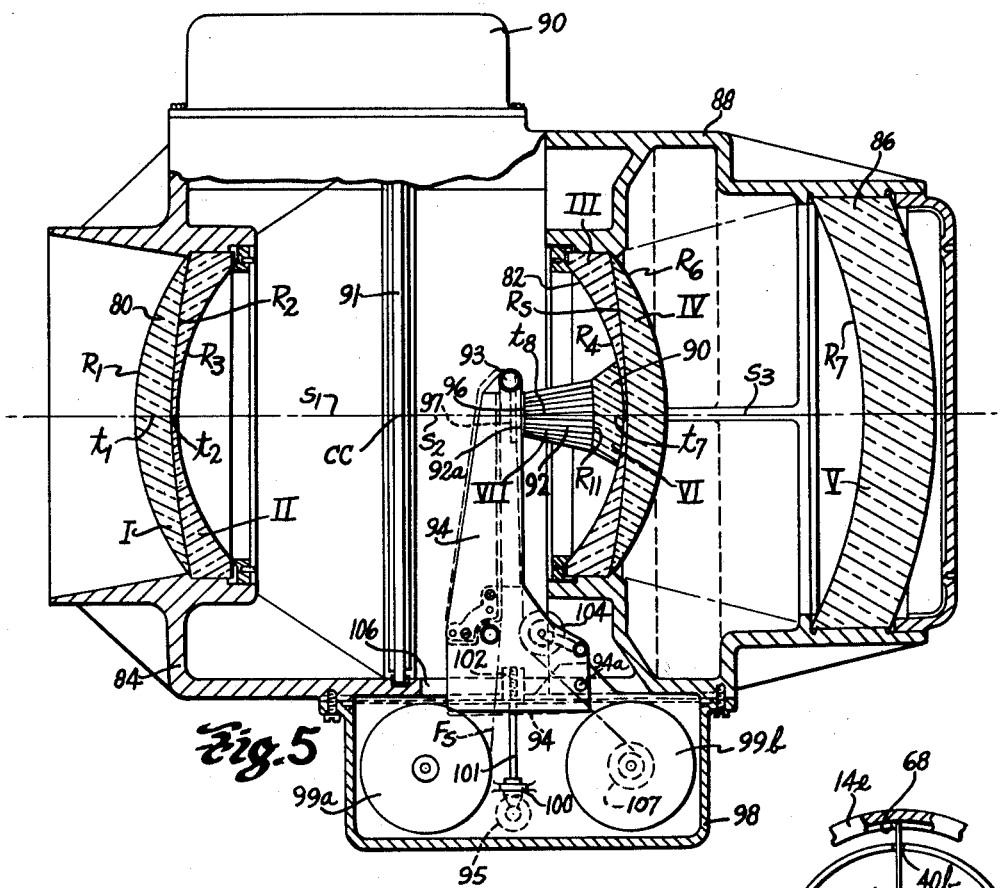
Fig. 5
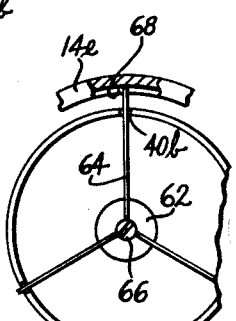
Fig. 7
| TABLE B | | | | |
|---|---|---|---|---|
| E.F.L.=1.000 | TOTAL FIELD ANGLE 25° | | f/0.53 | |
| UNIT | RADII | THICKNESSES | ND | V |
| I | $R_1$=2.1243 | $t_1$ = 0.2832 | 1.51733 | 52.16 |
| II | $R_2$=5.4412 | $t_2$ = 0.0378 | 1.51671 | 64.20 |
| | $R_3$=1.8032 | | | |
| DIAPHRAGM | | $s_1$= 1.80325 | AIR | |
| | | $s_2$= 1.80325 | | |
| III | $R_4$=−1.8032 | $t_3$ = 0.0378 | 1.51671 | 64.20 |
| IV | $R_5$=−5.4412 | $t_4$ = 0.2832 | 1.51733 | 52.16 |
| | $R_6$=−2.1243 | | | |
| | | $s_3$= 1.6522 | AIR | |
| V | $R_7$= 3.7764 | | MIRROR | |
| VI | SEE $R_4$ AND $R_{11}$ | $t_7$ = 0.2510 | | 64.20 |
| VII | $R_{11}$=−1.5502 | FIBER BUNDLE TAPER 1.51 to 1 | | |
| | $R_{12}$= PLANO | | | |
Fig. 6
INVENTORS
WALTER P. SIEGMUND
RALPH H. WIGHT
BY
*Louis K. Gagnon*
*Noble J. Williams*
ATTORNEYS United States Patent Office 3,142,236
Patented July 28, 1964

3,142,236
CAMERAS AND HIGH SPEED OPTICAL
SYSTEM THEREFOR
Walter P. Siegmund, Woodstock, Conn., and Ralph H. Wight, Flushing, N.Y., assignors to American Optical Company, Southbridge, Mass., a voluntary association of Massachusetts
Filed Mar. 8, 1961, Ser. No. 94,332
15 Claims. (Cl. 95—11)

This invention relates to a camera and associated high-speed image-forming optical system. More particularly, the invention relates to an improved camera and image-forming optical system therefor which may be operated at unusually high optical speeds and with excellent image definition while being substantially free from or very well corrected for the various optical aberrations (such as spherical aberration, chromatic aberration, astigmatism, coma, distortion and curvature of field) generally encountered in photographic equipment provided with high quality image-forming optical systems.

While relatively high degrees of optical performance will be obtained by the improved camera and image-forming optical system of the present invention when of a preferred construction and arranged so as to operate as a single shot camera or the like, nevertheless, the invention is such as to provide excellent photographic results at a somewhat lesser optical speed when adapted for strip film photography or the like.

While the improved camera and optical system of the present invention may be employed to advantage in many different ways, they, nevertheless, find particular utility in the fields of aerial photography, astronomical photography and the like wherein the photographing conditions encountered may often limit the time during which the film in the camera can be exposed.

More explicity, the improved camera and associated high-speed optical system of the present invention embody a modified monocentric catadioptric optical system comprising a spherical mirror, similar front and rear spherically curved substantially no-power meniscus correction lens elements in concentric relation thereto, a tapered fiber optical bundle within the system and a transparent spacer and support member therefor. The transparent spacer or support member, it will be noted, is constructed and arranged so as to provide at one face thereof a curved surface which fits the concave curvature of the no-power meniscus member upon which it is supported and at the opposite face thereof has a curved surface which is of substantially the same shape and curvature as the curvature of the real image being formed by and within the system, and, furthermore, this spacer is of such thickness and transverse dimensions as to locate this latter surface accurately at the rear focal plane of the system. Additionally, it will be noted that the tapered fiber optical bundle has its entrance end suitably shaped to fit the concave surface of the spacer and is carried by this surface in such a manner as to transfer this real concavely curved optical image at a materially increased optical speed, and without any increase in the optical aberrations of the system, to a second smaller flat image plane within the system. Thus, photographic film may be positioned snugly against this flat surface during exposure and even in optical contact therewith, as will be more fully explained hereinafter.

Additionally, the improved camera may be provided with novel strip film handling means to allow the camera and high-speed optical system thereof to be used more efficiently and conveniently and for successively obtaining a plurality of photographs without appreciable delay. Even though the optical efficiency of the optical system thereof may be reduced somewhat by such an arrangement, nevertheless, the advantage obtained thereby and not otherwise obtainable by such a high-speed camera and optical system will often more than justify such losses in optical efficiency.

It is well known that a reflecting optical system employing a concave spherical mirror and a suitably aspherically curved Schmidt corrector plate, or a suitable pair of substantially no-power meniscus lens elements can be operated at a much higher optical speed than is possible in conventional refracting-type optical systems while giving good image definition and nearly complete freedom from color aberrations. Such an aspherically curved plate or pair of no-power meniscus elements, in effect, serve in such a system to introduce a sufficient amount of negative spherical aberration to substantially completely compensate for the inherent spherical aberrations of the spherical mirror. However, the real image formed by such an optical system on the short conjugate side of the system is formed within the system and also this image has an appreciable curvature of field. The result is that such conditions have often been considered by optical designers to be material drawbacks or handicaps to the system, particularly when intended for use in a camera or the like.

It has been found, however, that advantage may be taken of such a high-speed high performance catadioptric optical system in an associated camera for long range photographic purposes, and the like, and even much higher speeds and improved optical and photographic results can be obtained by the camera by the use of suitable optical means including a tapered fiber optical bundle of proper physical and optical characteristics and suitable transparent support means positioned within the system in such a manner as to occupy an otherwise unused space therein. The camera employing the improved catadioptric optical system may also be used to good advantage in connection with strip film or the like when equipped with the novel film transport means, and even though some of the light rays from the object field may be blocked out by the vignetting effect of such an arrangement, nevertheless, very high optical performance may be obtained thereby.

It is, accordingly, an object of the present invention to provide a camera and associated high-speed high performance catadioptric image-forming optical system which includes transparent support means and a tapered fiber optical bundle for supporting a sensitized film at and for forming a real image at a flat image plane in said system for photographic purposes.

It is also an object of the invention to provide in such a camera using the improved high-speed high performance catadioptric optical system novel film transport means in such a manner that a plurality of different photographic exposures, or the like, may be obtained on strip film within the camera without requiring any appreciable delay between successive exposures of the film.

Other objects and advantages of the invention will become apparent from the detailed description which follows when taken in conjunction with the accompanying drawing in which:

FIG. 1 is a longitudinal sectional view through a single shot aerial or astronomical type camera embodying the improved catadioptric optical system of the present invention;

FIG. 2 is a chart providing optical values for the improved image-forming optical system of FIG. 1;

FIG. 3 is a fragmentary sectional view of a part of the camera of FIG. 1;

FIG. 4 is a transverse sectional view which has been taken through a camera somewhat like that of FIG. 1 but modified to accept strip film for exposure therein;

FIG. 5 is a longitudinal sectional view taken through a camera employing the present invention but modified to handle strip film in an efficient manner;

FIG. 6 is a chart providing optical values for the improved optical system of FIG. 5; and FIG. 7 is a fragmentary transverse sectional view showing parts of the camera structure of FIG. 1.

Referring to the drawings in detail and in particular FIG. 1, it will be seen that the numeral 10 indicates generally a camera comprising front and rear housing parts 12 and 14 which are generally circular in cross-sectional shape and have flanged mating edges, as indicated at 16, so that these portions may be secured together in a light-tight fashion by a plurality of manually operable thumb screws 18 or the like. Each of these thumb screws has a knurled head portion and a threaded shank portion which extends through an outer peripheral flange 14a of the rear housing part 14 and into a threaded projection 12a carried upon the inner surface of the front housing part, as best shown in FIG. 3. To an upper region of the front part 12 is secured a mounting block 20 having a threaded opening 21 in usual manner therein so as to be readily attachable to and detachable from a tripod or equivalent supporting means.

The rear housing part 14 has a rearwardly extending tubular section 14b which is provided with a narrow internal annular flange 14c against which a spacing ring 22 bears; and this ring 22 serves as means for exactly spacing a spherically curved front surface mirror 24 so that its center of curvature will be accurately located at the predetermined optical center of the camera housing indicated at C. The spherically curved mirror 24 has its forward circumferential edge held in engagement with this spacing ring by a cover or closure member 26 screw-threaded into the rear open end of the tubular section 14b and into engagement with the rear face of the mirror.

A larger inwardly projecting peripheral flange 14d is provided upon the rear housing 14 in such a manner as to support a substantially no-power meniscus refracting lens element 28, and a retaining ring 30 is arranged to threadably engage this flanged part 14d forwardly of the lens element 28 and in such a way as to hold the element 28 in position against a small annular shoulder 14e. In this position, the element 28 will be in concentric relation to the center C and in axial alignment with the mirror 24 along an optical axis 31.

The forward housing part 12 is provided with an internal circumferential shoulder 32 for positioning a front no-power meniscus refracting lens element 34 which is held in place by a ring 36 threadably engaging the housing part 12 in such a manner that this lens element 34 will likewise be held in exact concentric relation to the central point C and in axial alignment with the mirror 24. The front housing part 12 is also arranged with an internal recess indicated at 38 for receiving and centering a mounting flange 39 into which a conventional iris diaphragm and shutter mechanism 40 may be screw-threaded.

An outer aperture adjustment ring 42 is externally rotatably mounted upon the forward housing part 12 and is retained in place by a collar 44 removably secured to the housing part 12. Thus, this adjustment ring 42, which has a finger 46 upon its rear side and extending rearwardly through an arcuate slot 48 in the housing part 12, may be rotated various angular amounts for changing the aperture setting of the mechanism 40 by having the finger engage in a small slot therefor in a ring portion 40a of the shutter mechanism. A small threaded plug is shown at 50 in a lower region of the housing part 12 for retaining the inner end of a conventional flexible shutter release cable 52 in place for engagement with a trip button or the like 54 for actuating the shutter mechanism.

As stated previously, the front and rear no-power maniscus lens elements 34 and 28 are of such radii and thicknesses that they will compensate to a very high degree for the inherent positive spherical aberration of the front surface mirror 24. However, even though the optical values of the components of this optical system are such that very good image-forming properties at very high optical speeds are provided thereby, nevertheless, it will be noted that the real image formed thereby when the system is in use will have appreciable curvature of field and will be disposed within the optical system and at an axial location rearwardly of the optical center C of the system.

It has been found, however, that by the use of a transparent support or spacer 56 of proper size, shape, thickness and refractive optical properties in combination with a fiber optical image-transfer bundle 60 of proper size, shape, taper and thickness, it is possible not only to focus the appreciably curved real image (of a distant object field) upon the exit or forwardly facing surface of this transparent spacer or support 56 so as to have all parts of the image in substantially complete coincidence with this surface but also possible to have the fiber optical bundle 60 carried by this exit surface and of proper curvature so as to fit closely when cemented thereto. Also, at the same time, the tapered fiber bundle can be made of proper size and taper so as to accept the light forming this real image and conduct this light through the tapered fibers of the bundle to a second surface forming a flat image plane of smaller predetermined size at the forward or exit end of the bundle 60.

Since this exit end of the bundle can be and is made flat without introduction of any undesirable aberrations or distortions in the resulting image at its exit end, it is possible to position a photographic film or the like in direct contact with all of the fibers at the exit surface. Two important contributions provided by the transparent support 56 are firstly that by its use in the optical system, no other support means which might block out some radiation will be needed for positioning the fiber optical bundle in the system, and, secondly, that the total light loss due to reflection of light rays at the interfaces in the optical path between the mirror and the exit end of the fiber bundle are greatly reduced, when compared with a similar system but wherein no such transparent support is employed.

The highest possible optical speeds will be obtained by such a system when used as a single shot camera and this can be done by the use of a compatible transparent adhesive material preferably a liquid or semi-liquid, of proper refractive index approximating the index of refraction of the photographic film emulsion; such as natural or synthetic immersion oil, or mineral oil or the like to adhere a piece of photographic film of small size upon this flat end surface for photographic purposes. Of course, the adhesive material should be of such a character as to not injure the emulsion of the film.

Accordingly, when an optical system ratioed in accordance with the optical values set forth in the following Table A for an effective focal length of 1 inch are employed, it is possible to obtain a catadioptric photographic optical system for aerial photography, or the like, which has a total field angle of 25 degrees and the very high optical speed of approximately $f/0.58$.

Table A

[E.F.L.=1.000. Total Field Angle 25°. f/0.58]

| | Radii | Thickness | C.A. | N_D | N_F | N_C | V |
|---|---|---|---|---|---|---|---|
| I | $R_1=1.947$ | $t_1=0.294$ | 2.42 | 1.51671 | 1.52236 | 1.51431 | 64.2 |
| | $R_2=1.647$ | | 2.24 | | | | |
| Diaphragm | | $s_1=1.647$ | 1.73 | | | | |
| | | $s_2=1.647$ | | | | | |
| II | $R_3=-1.647$ | $t_2=0.294$ | 2.42 | 1.51671 | 1.52236 | 1.51431 | 64.2 |
| | $R_4=-1.947$ | | 2.76 | | | | |
| | | $s_3=1.511$ | | | | | |
| III | $R_5=-3.448$ | Approx. 65 | 3.63 | 1.0000 | −1.0000 | −1.0000 | |
| IV | $R_8=-1.647$ | $t_4=-0.231$ | .86 | 1.51671 | 1.52236 | 1.51431 | 64.2 |
| | $R_9=-1.416$ | | .62 | | | | |
| V | $R_{11}=-1.416$ | $t_5=-0.431$ | .62 | Fibre Bundle Taper 1.41 to 1 | | | |
| | $R_{12}=$Plano | | .43 | | | | |

I, II, IV = BK −7 Glass    V = Pyrex

In the above table, the numerals I–V indicate, respectively, the different optical components of the system, the letter R with different sub-numerals indicates the radii of the different optical surfaces of the system and the letters $t$ and $s$ with different sub-numerals indicate, respectively, the different thicknesses of and axial spacings between components of the system. Also, the letters C.A. indicate clear aperture values for the components, the letters $N_D$, $N_F$ and $N_C$ indicate the refractive indices for the D, F and C lines of the spectrum and the letter V represents the dispersion values for the optical materials employed. The fiber bundle has a 1.41 to 1 taper ratio.

In other instances, different taper ratios might be preferred and, for this reason, the following should be noted.

The taper ratio of the fiber bundle which can be used in any similar optical system is limited by the numerical aperture of the input light being supplied to the bundle and also the limiting numerical aperture of the individual fiber elements of the bundle. The latter is a function of the indices of refraction of the individual fiber cores and of their surround or cladding and this numerical aperture is usually defined in terms of the numerical aperture of the limiting meridional ray by the formula:

$$N.A.=\sqrt{n_1^2-n_2^2}$$

Wherein $n_1$ is the index of the core
$n_2$ is the index of the surround.

For example, for an input numerical aperture of 0.5 corresponding to an aperture ratio of $f/1.0$ for the catadioptric system (apart from the fiber bundle) and a fiber bundle having a numerical aperture of 1.0 (i.e., the core index of 1.8 and the surround index of 1.5) a taper ratio of 2.00 to 1 for the fiber bundle could be used.

While the camera, as shown in FIG. 1, is essentially a fixed focus camera focused at infinity, it may be easily arranged for a nearer object distance by making the spacing ring 22 of a proper predetermined greater thickness in accordance with the distance selected.

The fastest optical speed for this camera will be obtained when a properly sized piece of cut film is adhered to the fiber bundle by a liquid providing immersion or optical contact therebetween, since no obstructing of the entering light rays by any film supporting structure or the like will occur. However, it may be preferable at times to use structural means in the camera and, accordingly, gain at least a degree of security against lateral slippage or "creep" for the adhered film; and this can be accomplished by providing merely a flanged cap 62 of proper size and shape and by having the flange thereof arranged for frictional engagement about the outer end of the bundle. The cap would then hold the film and mineral oil or the like in optical contact with the smaller end of the bundle, and only the flanged outer edge of cap might obstruct entering light rays. Thus, the optical speed of the system would be at most only slightly lessened.

For a more positive arrangement which will not only prevent lateral slippage or creep of the adhered cut film but also assure optical contact under all operative conditions, a spider-like support member may be provided also. Such a member is indicated at 64 in FIGS. 1 and 6 and, in this instance, includes three equally spaced thin legs (thin with reference to the direction of the entering light rays so as not to block out more light than absolutely necessary) extending outwardly from a center bushing carrying a releasable thumb screw 66 and each leg is arranged to extend through a slot 40b in a flange on the shutter mechanism 40 and into an internal groove 68 in the forward annular projection 14g of housing part 14. Only a slightly larger percentage of the entering light rays will be intercepted by such a structural arrangement and, on the other hand, certainty of optical contact and proper centering of the film will be well worth this sacrifice.

In FIG. 4 is shown a continuous strip film supporting tunnel-like structure which may be used as a modification when a number of exposures are desired in quick succession in such a high-speed camera arrangement. However, it must be appreciated that as much as 20 to 30% of the total light entering the system may be obstructed by such an arrangement. This structure comprises a hollow tunnel-like member 70 of opaque material and of a size to closely accommodate and guide strip film $F_1$ therethrough and is arranged to extend across the housing in such a manner as to be confined between pairs of recessed flanges at opposite sides of the camera, the recessed flanges 72 and 74 carried by the front and rear parts of the housing, respectively, at opposite sides thereof, one side only being shown in the drawing. A central circular opening in the wall portion of the tunnel facing the small end of the bundle is shown at 76 and since this opening would fit closely about the bundle and the outer side walls of the bundle will be coated with an opaque black paint, or the like, there will be formed, in effect, a camera housing for protecting the sensitized film from all light rays except those reaching the film through the fiber optical bundle.

The above camera and high-speed optical system may be optically and structurally modified, if desired, to obtain not only improved achromatic qualities (over those of the optical system of FIG. 1 which are already of a superior quality) but also to render the camera much more convenient and rapid in the speed at which strip film may be advanced and successive pictures may be taken.

The color aberrations of the optical system shown in

FIG. 5 are reduced substantially to zero by the use of a pair of like cemented achromatic doublets 80 and 82, instead of using single-element no-power plates as in FIG. 1. Each doublet comprises a convergent meniscus lens element and a divergent meniscus lens element of controlled differing refractive indices and nu values, so that when they are cemented together and a pair of such doublets are used together in the optical system, not only will the system be corrected for spherical aberration but also chromatic aberrations will be substantially eliminated.

The front doublet 80 is carried by a front housing part 84 and the rear doublet 82 and the spherical mirror 86 are carried by a rear housing part 88 in much the same manner as that already described for the structure of FIG. 1. A spacing and supporting optical element 90 is cemented to the front surface of the rear corrector plate and to its forward surface a fiber optical image-transfer bundle 92 is adhered. An optical design for the system of FIG. 5 ratioed to an effective focal length of 1.000 is as shown in the following Table B, and wherein the optical components of the system are represented by Roman numerals in the order in which they are subjected to the image-forming light rays passing through the system to the strip film $F_2$ at the flat image plane of the system.

*Table B*
[E.F.L.=1.000. Total Field Angle 25°. f/0.53]

| Element | Radii | Thicknesses | $N_D$ | V |
|---|---|---|---|---|
| I | $R_1=2.1243$ | $t_1=0.2832$ | 1.51733 | 52.16 |
| II | $R_2=5.4412$ | $t_2=0.0378$ | 1.51671 | 64.20 |
| | $R_3=1.8032$ | | | |
| Diaphragm | | $s_1=1.80325$ | Air | |
| | | $s_2=1.80325$ | | |
| III | $R_4=-1.8032$ | $t_3=0.0378$ | 1.51671 | 64.20 |
| IV | $R_5=-5.4412$ | $t_4=0.2832$ | 1.51733 | 52.16 |
| | $R_6=-2.1243$ | $s_3=1.6522$ | Air | |
| V | $R_7=-3.7764$ | | Mirror | |
| VI | See $R_4$ and $R_{11}$ | $t_7=0.2510$ | 1.51671 | 64.20 |
| | $R_{11}=-1.5502$ | | | |
| VII | $R_{12}=$Plano | Fiber Bundle Taper 1.51 to 1 | | |

The fiber bundle serves both to flatten the image field and increase the effective numerical aperture of the system from N.A.=0.61 or (f/0.82) to N.A.=0.945 or (f/0.53).

The camera structure of FIG. 5, however, employs a different type of shutter and shutter-operating mechanism (not shown) which is housed in an upper compartment 90 and arranged to control a light-control diaphragm 91 transversely disposed in the camera so as to intercept the entering light beam at the optical center CC of the optical system. Within the camera and rearwardly of this diaphragm is located strip film-supporting and handling means which is arranged to hold an area of a strip film in optical contact with the small end 92a of the fiber bundle 92 during exposure of the area and to move the film out of contact with said bundle when the film is to be advanced for the next exposure or the like.

This film-handling means comprises a removable enclosure or magazine 98 carrying a light-tight hollow supporting frame 94 which extends from one side of the main housing into the camera and into the lightbeam thereof. The hollow frame carries removable pin or equivalent film-guiding means 93 within its inner end. Also this frame is provided with a light aperture 96 for receiving the smaller end of the fiber bundle and pressure plate means 97 within the hollow frame for insuring positive contact between the film $F_S$ and the fiber bundle. The frame 94, in fact, in this instance is pivotally attached by suitable means 94a near its rear lower corners to the removable enclosure 98 which is also arranged to house a pair of strip film reels 99a and 99b. Conventional actuating means is indicated at 107; and this enclosure, in turn, is connected to the main housing of the camera by screws or equivalent means in such a way as to insure a light-tight structure.

The pivotal arrangement for the frame 94 is such that it may be moved between the film-pressing solid line position and the film-releasing dotted line position shown in FIG. 5 of the drawing by externally operable means 95 connected through suitable gearing 100 to a thrust shaft 101 which has its threaded upper end in operative engagement with a threaded collar 102 secured to the frame 94. Thus, limited amounts of rotation of the externally operable means will pivotally move the upper end of the frame 94 forwardly or rearwardly as desired and will hold the pressure plate 97 in firm engagement with the fiber bundle or will release same for film advancing. Suitable film-guiding and tensioning means is indicated at 104.

When a new film is to be inserted in the camera in place of an exposed one, the enclosure 98 may be readily removed from the camera housing and at the same time the film and frame 94 supporting this film may be withdrawn from the camera through an opening 106. While slight pivoting of the frame 94 has been indicated as a way to remove the film from contact with the fiber bundle before starting travel of the film and also for urging firm contact therebetween during the taking of each picture, the use of other modified arrangements is possible; such as, cam and guide means for urging the pressure plate 97 and film into contact with the fiber bundle without pivotal movement of the frame 94.

Where reference has been made variously in the specification to the smaller end of the fiber optical image-transfer bundle as being "flat" or "substantially flat," it should be appreciated that such a condition is desirable principally in order to enable conventional photographic film to readily assume a complete surface-to-surface contact with all parts of the end of the bundle during film exposure; a condition it could not assume if the image field were more or less concavely spherically curved as is the case at the first image plane. This makes it possible to obtain higher optical speeds than possible otherwise. It follows, however, that since such film will bend easily in one direction only at any selected time, a "flat" condition must be provided by the shape of the bundle end in one direction even though either a flat or a slightly curved condition may be used on the bundle end in a direction at right angles thereto.

Preferably, the outer side walls of the fiber optical bundles 60 and 92 and of the spacer 56 will be blackened by paint or the like. Also, in a camera using only sensitized film adhered to the end of the fiber bundle and without also employing the opaque cap 62 or other means for securing the film in place on the bundle, an opaque coating or the like will be necessary on the forward face of the film in order to protect it from exposure to the light beam prior to its reflection by mirror 24.

The degree of image resolution which the fiber optical image-transfer bundle 60 or 92 will provide at its smaller ends will, of course, depend upon the size and number of individual tapered coated fibers employed in the bundle. Since in the catadioptric optical system disclosed in FIG. 5 and employing, for example, a spherical mirror of a radius of 14.12 inches, the design is capable of putting 100% of the light from the object field at infinite focus within a 72 micron circle at all points of the image field, the fibers of the bundle 92 must each have a diameter of at most this size at their larger ends, and in view of the actual distribution of this light within each 72 micron circle, they should each have a diameter of only about one-half of this amount in order to preserve most of the incident image information. Thus, the lower limit would call for about 450,000 fibers in the bundle 92 while for excellent resolving power about 1,800,000 should be used.

Having described our invention, we claim:

1. A relatively high-speed image-forming catadioptric optical system comprising a concave spherical mirror, optical aberration correcting refractive means in axial alignment with said mirror, said refractive means including a spherically curved refractive meniscus component disposed in predetermined spaced relation relative to a transverse plane extending through the center of curvature of said mirror located between said center of curvature and said mirror, said refractive means being of such predetermined thickness, optical characteristics and radius of curvature as to provide in said system negative spherical aberration of an amount sufficient to substantially compensate for the inherent positive spherical aberration of said mirror, said system providing an image of predetermined concave curvature at a real image plane within the system and axially located intermediate said center of curvature of said mirror and said mirror, a tapered fiber optical image transfer bundle positioned in said system with its larger end so curved and so disposed as to provide a fiber optical entrance surface in substantial coincidence with said concavely curved image, a transparent spacer of predetermined thickness carried by said refractive meniscus component on the concave side thereof and supporting the larger end of said tapered bundle at said curved image plane, the smaller end of said tapered fiber optical bundle terminating within said system and being so shaped as to accommodate photographic film in surface-contacting relation thereto during exposure of said film, and a relatively small opaque cap fitting over and engaging the smaller end of said bundle so as to retain said film in space-contacting relation with said bundle.

2. A relatively high-speed image-forming catadioptric optical system comprising a concave spherical mirror, optical aberration correcting means including similar front and rear spherically curved substantially no-power refractive meniscus components in axial alignment with said mirror, said refractive components being disposed at opposite sides of a transverse plane extending through the center of curvature of said mirror and spaced substantially equal amounts from said center, and being of such predetermined thicknesses, optical characteristics and radii of curvature as to provide in said system negative spherical aberration of an amount sufficient to substantially compensate for the inherent positive spherical aberration of said mirror, said system providing a real image of predetermined concave curvature at an image plane within said system and axially located intermediate said center of curvature and said rear refractive component, a tapered fiber optical image transfer bundle positioned in said system with its larger end so curved and so disposed toward said mirror as to provide a fiber optical entrance surface in substantial coincidence with said concavely curved image, a transparent spacer of predetermined thickness having a convex surface engaging and supported by the adjacent concave surface of said rear refractive meniscus component and having its opposite surface shaped to receive and support the larger curved end of said fiber optical bundle at said curved image plane, and the smaller end of said tapered fiber optical bundle terminating within said system and being so shaped as to accommodate a photographic film in surface-contacting relation thereto during exposure of said film, and an opaque cap for engaging and enclosing film at the smaller end of said bundle in such a manner as to maintain said film in contact with said bundle.

3. A relatively high-speed image-forming catadioptic optical system comprising a concave spherical mirror, optical aberration correcting means including similar front and rear spherically curved substantially no-power refractive meniscus components in axial alignment with said mirror, said refractive components being disposed at opposite sides of a transverse plane extending through the center of curvature of said mirror and spaced substantially equal amounts from said center, and being of such predetermined thicknesses, optical characteristics and radii of curvature as to provide in said system negative spherical aberration of an amount sufficient to substantially compensate for the inherent positive spherical aberration of said mirror, said system providing a real image of predetermined concave curvature at an image plane within said system and axially located intermediate said center of curvature and said rear refractive component, a tapered fiber optical image transfer bundle positioned in said system with its larger end so curved and so disposed toward said mirror as to provide a fiber optical entrance surface in substantial coincidence with said concavely curved image, a transparent spacer of predetermined thickness having a convex surface engaging and supported by the adjacent concave surface of said rear refractive meniscus component and having its opposite surface shaped to receive and support the larger curved end of said fiber optical bundle at said curved image plane, and the smaller end of said tapered fiber optical bundle terminating within said system and being so shaped as to accommodate a photographic film in surface-contacting relation thereto during exposure of said film, an opaque cap for engaging and enclosing film at the smaller end of said bundle, and a supporting structure having means at its center for pressing said cap toward said bundle and a plurality of relatively long thin arms extending outwardly from the center of said support so as to engage and be retained in a fixed position by camera housing structure outside of said optical system during exposure of said film.

4. A relatively high-speed image-forming catadioptric optical system comprising a concave spherical mirror, optical aberration correcting means including similar front and rear spherically curved substantially no-power refractive meniscus components in axial alignment with said mirror, said refractive components being disposed at opposite sides of a transverse plane extending through the center of curvature of said mirror, and being of such thicknesses, optical characteristics and radii of curvature as to provide in said system negative spherical aberration of an amount sufficient to substantially compensate for the inherent positive spherical aberration of said mirror, said system providing a real image of predetermined concave curvature at an image plane within said system and axially located intermediate said center of curvature and said rear refractive component, tapered fiber optical image transfer bundle positioned in said system with its larger end so curved and so disposed toward said mirror as to provide a fiber optical entrance surface in substantial coincidence with said concavely curved image, a transparent spacer of predetermined thickness having a convex surface engaging and supported by the adjacent concave surface of said rear refractive meniscus component and having its opposite surface shaped to receive and support the larger curved end of said fiber optical bundle at said curved image plane, and the smaller end of said tapered fiber optical bundle terminating within said system and being so shaped as to accommodate a photographic film in surface-contacting relation thereto during exposure of said film, an opaque tunnel extending from an outer location at one side of said system and outwardly of the path of the light rays thereof to an inner location adjacent the smaller end of said fiber bundle, said tunnel being relatively long and narrow and having means for guiding photographic strip film along a path from said outer location by the smaller end of said bundle and back to said outer location during step-by-step movement thereof, an opening in a rear wall portion of said tunnel adjacent said bundle of a size sufficient to admit the smaller end thereof for optical contact with said film, and means for mounting said tunnel for slight movement toward and away from said bundle intermediate successive exposure of said film.

5. A camera having a housing and a relatively high-speed image-forming catadioptric optical system carried thereby, said optical system comprising a concave spherical mirror, spherical aberration correcting means including similar front and rear spherically curved substantially no-power refractive meniscus components in axial alignment with said mirror, said refractive components being disposed at opposite sides of a transverse plane extending through the center of curvature of said mirror, and being of such thicknesses, optical characteristics and radii of curvature as to provide in said system a negative spherical aberration of an amount sufficient to substantially compensate for the inherent positive spherical aberration of said mirror, said system providing a real image of predetermined concave curvature at an image plane within said system and axially located intermediate said center of curvature and said rear refractive component, a tapered fiber optical image transfer bundle positioned in said system with its larger end so curved and so disposed toward said mirror as to provide a fiber optical entrance surface in substantial coincidence with said concavely curved image, a transparent spacer of predetermined thickness having a convex surface engaging and supported by the adjacent concave surface of said rear refractive meniscus component and having its opposite surface shaped to receive and support the larger curved end of said fiber optical bundle at said curved image plane, and the smaller end of said tapered fiber optical bundle terminating within said system and being so shaped as to accommodate a photographic film in surface-contacting relation thereto during exposure of said film, a strip film handling magazine removably carried by and at one side of said housing and having a film-supporting and enclosing frame extending into said optical system so as to guide said film along a path from a location outwardly of the light rays of said system to an inner location in adjacent relation to the smaller end of said bundle, an opening in said frame for receiving the smaller end of said bundle, and readily operable means carried by said magazine for advancing said film for successive exposures thereof, and additional operable means carried by said magazine for urging each successive film area to be exposed into optical contact with the smaller end of said bundle before exposure thereof.

6. A relatively high-speed image-forming catadioptric optical system comprising a concave spherical mirror, spherical aberration correcting refractive means in axial alignment with said mirror, said refractive means being disposed in predetermined spaced relation relative to a transverse plane extending through the center of curvature of said mirror, said refractive means being of such thickness, optical characteristics and radius of curvature as to provide in said system negative spherical aberration in such an amount as to substantially compensate for the inherent positive spherical aberration of said mirror, said system providing an image of predetermined concave curvature at an image plane within the system and axially located intermediate said center of curvature and said mirror, and a tapered fiber optical image transfer bundle positioned in said system with its larger end so curved and so disposed therein as to provide a fiber optical entrance surface in substantial coincidence with said concavely curved image, the smaller end of said tapered fiber optical bundle terminating within said system and being so shaped as to accommodate photographic film in closely adjacent relation thereto, and an immersion material between said film and the smaller end of said bundle insuring optical contact therebetween.

7. A relatively high-speed image-forming catadioptric optical system comprising a concave spherical mirror having a radius of curvature of value between approximately 3.44F and 3.77F, similar front and rear spherically curved substantially no-power refractive components axially aligned with said mirror and disposed between approximately 1.65F and 1.81F to opposite sides of the center of curvature of said mirror, and each of said components having for its concave surface a radius of curvature between approximately 1.64F and 1.81F, each having for its convex curvature a radius between approximately 1.94F and 2.12F, and each having a thickness between approximately 0.29F and 0.32F, a spherically curved transparent spacer carried on the forward concave face of the rear substantially no-power component and having an inner radius of curvature between approximately 1.41F and 1.55F, and an outer radius of curvature between approximately 1.64F and 1.81F and a thickness between approximately 0.23F and 0.25F, said system providing a real image in substantial coincidence with the concave surface of said spacer, the predetermined indices of refraction of said front and rear no-power members being similar, and a fiber optical image transfer bundle of predetermined length and having a taper ratio between approximately 1.40 to 1 and 2.00 to 1 positioned with its larger end in substantial coincidence with and carried by the concave face of said spacer, and the smaller end of said bundle being disposed within said system and shaped so as to accommodate a photographic film in surface-contacting relation thereof, and wherein F is the effective focal length of said system.

8. A relatively high-speed image-forming catadioptric optical system comprising a concave spherical mirror having a radius of curvature of value equal approximately to 3.44F, similar front and rear spherically curved substantially no-power refracting components axially aligned with said mirror and disposed approximately 1.65F to opposite sides of the center of curvature of said mirror, and each of said components having for its concave surface a radius of curvature equal approximately to 1.65F, each having for its convex curvature a radius equal approximately to 1.94F and each having a thickness equal approximately to 0.29F, a spherically curved transparent spacer carried on the forward concave face of the rear substantially no-power component and having an inner radius of curvature equal approximately to 1.41F, and an outer radius of curvature equal approximately to 1.65F and a thickness equal approximately to 0.23F, said system providing a real image in substantial coincidence with the concave surface of said spacer, the predetermined indices of refraction of said front and rear no-power components being similar, and a fiber optical image transfer bundle of predetermined length and having a taper ratio equal approximately to 1.40 to 1 positioned with its larger end in substantial coincidence with and carried by the concave face of said spacer, and the smaller end of said bundle being disposed within said system and shaped so as to accommodate a photographic film in surface-contacting relation thereof, and wherein F is the effective focal length of said system.

9. A relatively high-speed image-forming catadioptric optical system comprising a concave spherical mirror having a radius of curvature of value equal approximately to 3.77F, similar front and rear spherically curved substantially no-power refracting achromatic doublet components axially aligned with said mirror and disposed approximately 1.81F to opposite sides of the center of curvature of said mirror, and each of said components having for its concave surface a radius of curvature equal approximately to 1.81F, each having for its convex curvature a radius equal approximately to 2.12F, and each having a thickness equal approximately to 0.32F, a spherically curved transparent spacer carried on the forward concave face of the rear substantially no-power doublet component and having an inner radius of curvature equal approximately to 1.55F, and an outer radius of curvature equal approximately to 1.81F and a thickness equal approximately to 0.25F, said system providing a real image in substantial coincidence with the concave surface of said spacer, the predetermined indices of refraction of said front and rear no-power doublet components being similar, and a fiber optical image transfer bundle of predetermined length and having a taper ratio equal approximately to 1.51 to 1 positioned with its larger end in substantial coincidence with and carried by the concave face of said spacer, and the smaller end of said bundle being disposed within said system and shaped so as to be flat in at least one direction for accommodating a photographic film in surface-contacting relation thereof, and wherein F is the effective focal length of said system.

10. A relatively high-speed image-forming catadioptric optical system comprising a concave spherical mirror having a radius of curvature of value equal approximately to 3.77F, similar front and rear spherically curved substantially no-power refracting achromatic doublet components axially aligned with said mirror and disposed approximately 1.80F to opposite sides of the center of curvature of said mirror, each of said doublet components having for its innermost concave surface a radius of curvature equal approximately to 1.80, each having for its spherical interface a radius of curvature equal to approximately 5.44F, and each having for its outermost convex curvature a radius equal approximately to 2.12F, the innermost element of each doublet component having a thickness equal approximately to 0.038F and a refractive index equal approximately to 1.5167 and the outermost element of each doublet component having a thickness equal approximately to 0.283F and a refractive index equal approximately to 1.5173, a spherically curved transparent spacer carried on the forward concave face of the rear substantially no-power doublet component and having an inner radius of curvature equal approximately to 1.55F, and an outer radius of curvature equal approximately to 1.80F and a thickness equal approximately to 0.25F, said system providing a real image in substantial coincidence with the concave surface of said spacer, and a fiber optical image transfer bundle of predetermined length and of taper ratio equal approximately to 1.51 to 1 positioned with its larger end in substantial coincidence with and carried by the concave face of said spacer, and the smaller end of said bundle being disposed within said system and shaped so as to accommodate a photographic film in surface-contacting relation thereof, and wherein F is the effective focal length of said system.

11. A relatively high-speed image-forming catadioptric optical system comprising a concave spherical mirror, spherical aberration correcting means including a pair of similar front and rear spherically curved substantially no-power achromatic doublet refractive components disposed in said system in axial alignment with said mirror, and at opposite sides of a transverse plane extending through the center of curvature of said mirror, each of said refractive components being spaced substantially equal amounts from said center and being formed by a negative meniscus lens element and a positive meniscus lens element of such predetermined thicknesses, refractive and dispersive characteristics and radii of curvatures as to provide in said system negative spherical aberration in amounts which substantially compensate for the inherent positive spherical aberration of said mirror while providing a minimum of chromatic aberration in said system, said system providing a real image of relatively small predetermined size and concave curvature at an image plane within the system and axially located intermediate the center of curvature of said mirror and said mirror, and a fiber optical image transfer bundle positioned in optical alignment in said system and with its entrance end facing toward said mirror, the entrance end of said bundle being of such a size and shape and so disposed in said system as to substantially coincide with said concavely curved image, said bundle being tapered intermediate its ends and having its exit end of appreciably smaller size than its entrance end so as to effect a material increase in optical speed for said system, the exit end of said bundle being shaped so as to accommodate means embodying a light-sensitive image-receiving area in surface contacting relation therewith.

12. A relatively high-speed image-forming catadioptric optical system comprising a concave spherical mirror, spherical aberration correcting means including a pair of similar front and rear spherically curved substantially no-power achromatic doublet refractive components disposed in said system in axial alignment with said mirror, and at opposite sides of a transverse plane extending through the center of curvature of said mirror, said refractive components being spaced substantially equal amounts from said center and being formed by a negative meniscus lens element and a positive meniscus lens element of such predetermined thicknesses, refractive and dispersive characteristics and radii of curvatures as to provide in said system negative spherical aberration in amounts which substantially compensate for the inherent positive spherical aberration of said mirror while providing a minimum of chromatic aberration in said system, a transparent spacer in said system adjacent the concave side of said rear component, said spacer having a convex surface of substantially the same curvature as the adjacent concave surface of said rear component, and secured thereto so as to be in axial alignment in said system, said system providing a real image of relatively small predetermined size and concave curvature at an image plane within the system at an axial location intermediate the center of curvature of said mirror and said mirror, said spacer having a concave surface on the opposite side thereof which is of substantially the same size and concave curvature as that of said real image, and having a predetermined thickness which is such as to locate the concave surface of said spacer substantially at said image plane, and a fiber optical image transfer bundle in optical alignment in said system with its entrance end facing toward said mirror, the entrance end of said bundle being of substantially the same size and shape, and being secured to the concave surface of said spacer in such a manner as to substantially coincide with said concavely curved image, said bundle being tapered intermediate its ends and having its exit end of appreciably smaller size than its entrance end so as to effect a material increase in optical speed for said system, and the exit end of said bundle being shaped so as to accommodate means embodying a light-sensitive image-receiving area in surface contacting relation therewith.

13. A relatively high-speed image-forming catadioptric optical system comprising a concave spherical mirror, spherical aberration correcting refracting means disposed in said system in axial alignment with said mirror, said refracting means being disposed in predetermined operative relation relative to a transverse plane extending through the center of curvature of said mirror, and being of such thicknesses, optical characteristics and radii of curvatures as to provide in said system negative spherical aberration in amounts which substantially compensate for the inherent positive spherical aberration of said mirror, said system providing a real image of relatively small predetermined size and concave curvature at an image plane within said system and axially located intermediate the center of curvature of said mirror and said mirror, and a fiber optical image transfer bundle positioned in optical alignment in said system and with its entrance end facing toward said mirror, the entrance end of said bundle being of such a size and shape and so disposed in said system as to substantially coincide with said concavely curved image, said bundle being tapered intermediate its opposite ends and formed of a relatively large number of individually tapered coated fiber optical elements, each of said fiber optical elements being provided with an overall taper between its entrance and exit ends which is such as to provide a material reduction in diameter at the exit end thereof, and the taper of all of said fiber optical elements collectively being such as to cause each individual fiber optical element at the entrance end thereof to face substantially directly toward that part of said concave mirror which directs image-forming rays onto the entrance end of said individual fiber optical element, each fiber optical element comprising a core of transparent material of a relatively high predetermined refractive index, $n_1$, and a cladding of a material of a lower predetermined refractive index, $n_2$, in surrounding contacting relation therewith, the refractive index difference provided at the interface between each core and cladding being such as to provide for each fiber optical element at its exit end a numerical aperture which, when determined by the formula $$N.A. = \sqrt{n_1^2 - n_2^2}$$

is of a materially increased value as compared to its numerical aperture value at the entrance end thereof, the exit end of said bundle being so shaped as to accommodate light-sensitive photographic sheet material in smooth surface-contacting relation therewith, whereby a material increase in the intensity of the optical image being directed onto said photographic sheet material at the exit end of said bundle will be provided.

14. A relatively high-speed image-forming catadioptric optical system comprising a concave spherical mirror, spherical aberration correcting means including a pair of similar front and rear spherically curved substantially no-power refracting components disposed in said system in axial alignment with said mirror, and at opposite sides of a transverse plane extending through the center of curvature of said mirror, said refracting components being spaced substantially equal amounts from said center of curvature and being of such thicknesses, optical characteristics and radii of curvatures as to provide in said system negative spherical aberration in amounts which substantially compensate for the inherent positive spherical aberration of said mirror, said system providing a real image of relatively small predetermined size and concave curvature at an image plane within said system and axially located intermediate the center of curvature of said mirror and said mirror, a fiber optical image transfer bundle carried by said rear spherically curved no-power refracting component and positioned in optical alignment in said system with its entrance end facing toward said rear refracting component and said mirror, the entrance end of said bundle being of such a size and shape and so disposed in said system as to substantially coincide with said concavely curved image, said bundle being tapered intermediate its opposite ends and formed of a relatively large number of individually tapered coated fiber optical elements, each of said fiber optical elements being provided with an overall taper between its entrance and exit ends which is such as to provide a material reduction in diameter at the exit end thereof, and the taper of all of said fiber optical elements collectively being such as to cause each individual fiber optical element at the entrance end thereof to face substantially directly toward that part of said concave mirror which directs image-forming rays onto the entrance end of said individual fiber optical element, each fiber optical element comprising a core of transparent material of a relatively high predetermined refractive index, $n_1$, and a cladding of a material of a lower predetermined refractive index, $n_2$, in surrounding contacting relation therewith, the refractive index difference provided at the interface between each core and cladding being such as to provide for each fiber optical element at its exit end a numerical aperture which, when determined by the formula $$N.A. = \sqrt{n_1^2 - n_2^2}$$

is of a materially increased value as compared to its numerical aperture value at the entrance end thereof, the exit end of said bundle being so shaped as to accommodate light-sensitive photographic sheet material in smooth surface-contacting relation therewith, whereby a material increase in the intensity of the optical image being directed onto said photographic sheet material at the exit end of said bundle will be provided.

15. A relatively high-speed image-forming catadioptric optical system comprising a concave spherical mirror, spherical aberration correcting means including a pair of similar front and rear spherically curved substantially no-power refracting components disposed in said system in axial alignment with said mirror, and at opposite sides of a transverse plane extending through the center of curvature of said mirror, said refracting components being spaced substantially equal amounts from said center of curvature and being of such thicknesses, optical characteristics and radii of curvatures as to provide in said system negative spherical aberration in amounts which substantially compensate for the inherent positive spherical aberration of said mirror, a transparent spacer in said system adjacent the concave side of said rear component, said spacer having a convex entrance surface of substantially the same curvature as the adjacent concave surface of said rear component, and being secured thereto so as to be in axial alignment in said system, said system providing a real image of relatively small predetermined size and concave curvature at an image plane within said system at an axial location intermediate the center of curvature of said mirror and said mirror, said spacer having a concave exit surface on the opposite side thereof which is of substantially the same size and concave curvature as that of said real image, said spacer being of such a predetermined thickness as to locate the concave exit surface thereof substantially at said image plane, and a fiber optical image transfer bundle in optical alignment in said system with its entrance end facing said concave mirror, the entrance end of said bundle being of substantially the same size and shape and being secured to the concave exit surface of said spacer in such a manner as to substantially coincide with said concavely curved image, said bundle being tapered intermediate its opposite ends and formed of a relatively large number of individually tapered coated fiber optical elements, each of said fiber optical elements being provided with an overall taper between its entrance and exit ends which is such as to provide a material reduction in diameter at the exit end thereof, and the taper of all of said fiber optical elements collectively being such as to cause each individual fiber optical element at the entrance end thereof to face substantially directly toward that part of said concave mirror which directs image-forming rays onto the entrance end of said individual fiber optical element, each fiber optical element comprising a core of transparent material of a relatively high predetermined refractive index, $n_1$, and a cladding of a material of a lower predetermined refractive index, $n_2$, in surrounding contacting relation therewith, the refractive index difference provided at the interface between each core and cladding being such as to provide for each fiber optical element at its exit end a numerical aperture which, when determined by the formula $$N.A. = \sqrt{n_1^2 - n_2^2}$$

is of a materially increased value as compared to its numerical aperture value at the entrance end thereof, the exit end of said bundle being so shaped as to accommodate light-sensitive photographic sheet material in smooth surface-contacting relation therewith, whereby a material increase in the intensity of the optical image being directed onto said photographic sheet material at the exit end of said bundle will be provided.

References Cited in the file of this patent

UNITED STATES PATENTS

| | | |
|---|---|---|
| 2,510,106 | Henroteau | June 6, 1950 |
| 2,528,308 | Helm | Oct. 31, 1950 |
| 2,983,835 | Frey | May 9, 1961 |

FOREIGN PATENTS

| | | |
|---|---|---|
| 884,415 | France | Apr. 27, 1943 |